Patented Jan. 14, 1930

1,743,740

UNITED STATES PATENT OFFICE

CONWAY VON GIRSEWALD AND HANS NEUMARK, OF FRANKFORT-ON-THE-MAIN, GERMANY

METHOD FOR MAKING ANHYDROUS ZINC CHLORIDE BY REACTING ZINC OXIDE WITH CHLORINE

No Drawing. Application filed March 27, 1928, Serial No. 265,216, and in Germany April 9, 1927.

This invention relates to a method for making anhydrous zinc chloride by reacting zinc oxide with chlorine in the presence of hydrogen.

Experiments have shown that zinc oxide, which does not directly react with chlorine, may be converted into zinc chloride, by reacting the zinc oxide with chlorine in presence of carbon or carbon monoxide, for example, by reacting a mixture of zinc oxide and carbon with chlorine or by reacting zinc oxide with a mixture of chlorine and carbon monoxide. In these reactions, however, only 70–75% of the zinc present in the oxide is converted into the chloride.

According to the invention the chlorination of the oxide is carried out in presence of hydrogen and eventually other reducing agents. Instead of working with pure hydrogen also hydrogen containing gas mixtures such as mixtures of hydrogen and carbon monoxide as for example water gas or generator gas may be used with advantage.

When working according to the invention the zinc oxide may first be preheated to suitable reaction temperatures of for example 300 to 400° C. A mixture of chlorine with hydrogen or hydrogen in admixture with other gases, such as carbon monoxide or carbon monoxide containing gases in suitable proportion is then passed at a suitable rate of flow through the preheated zinc oxide. When the reaction is once started no further heating is necessary, as the heat of reaction is sufficient to keep the reaction going.

*Example.*—Technical zinc oxide containing about 75% of zinc is preheated to a temperature of about 400° C. A mixture of one volume of chlorine and two volumes of water gas is then passed through the preheated zinc oxide at such a rate of flow, that the temperature is kept at 400 to 500° C. The produced molten, anhydrous zinc chloride is tapped and filtered, as long as it is liquid. The yield is quantitative with respect to zinc.

According to a modification the chlorination of the zinc oxide is carried through at higher temperatures of for example 700° C. The produced zinc chloride is then distilled off and condensed as comparatively pure product.

The new process may also be carried through by reacting finely distributed zinc oxide, for example atomized zinc oxide, with the reaction gases. Thus for example powdered zinc oxide may be blown into a preheated reaction vessel, into which at the same time are introduced chlorine and water gas or a mixture of these gases. The zinc oxide may, however, also be blown into the reaction vessel by the hydrogen containing gas and the chlorine or a chlorine containing gas mixture may enter the reaction vessel at a separate place for example in such a manner, that it is blown into the stream of hydrogen containing gas carrying the zinc oxide. In any case the produced zinc chloride may be removed in liquid form from the reaction vessel.

We claim:

1. A method for making anhydrous zinc chloride which consists in reacting heated zinc oxide with chlorine in presence of hydrogen.

2. A method for making anhydrous zinc chloride which consists in reacting heated zinc oxide with chlorine in presence of a hydrogen containing gas.

3. A method for making anhydrous zinc chloride which consists in reacting heated zinc oxide with chlorine in presence of a gas mixture containing hydrogen and carbon monoxide.

4. A method for making anhydrous zinc chloride which consists in reacting heated zinc oxide with chlorine in presence of water gas.

5. A method for making anhydrous zinc chloride which consists in reacting at temperatures above about 700° C., zinc oxide with chlorine in presence of hydrogen.

6. A method for making anhydrous zinc chloride which consists in blowing finely divided zinc oxide into a preheated reaction vessel fed with chlorine and hydrogen.

7. A method for making anhydrous zinc chloride which consists in blowing finely divided zinc oxide and chlorine and a hydrogen containing gas mixture into a preheated reaction vessel.

8. A method for making anhydrous zinc chloride which consists in blowing zinc oxide by a hydrogen containing gas into a preheated reaction vessel fed with a chlorine containing gas.

9. A method for making anhydrous zinc chloride which consists in blowing zinc oxide by a hydrogen containing gas into a preheated reaction vessel, blowing a chlorine containing gas into the stream of hydrogen containing gas carrying the zinc oxide and removing the produced zinc chloride from the reaction vessel.

10. A method for making anhydrous zinc chloride which consists in blowing zinc oxide by a hydrogen containing gas into a preheated reaction vessel, blowing a chlorine containing gas into the stream of hydrogen containing gas carrying the zinc oxide and removing the produced zinc chloride by distillation.

In testimony whereof we affix our signatures.

BARON CONWAY VON GIRSEWALD.
DR. HANS NEUMARK.